United States Patent [19]

Le Floch

[11] Patent Number: 4,782,573

[45] Date of Patent: Nov. 8, 1988

[54] APPARATUS FOR DEFORMING A GASKET

[75] Inventor: Alain Le Floch, Blois, France

[73] Assignee: Pont-A-Mousson S.A., Nancy, France

[21] Appl. No.: 71,963

[22] Filed: Jul. 10, 1987

[30] Foreign Application Priority Data

Jul. 10, 1986 [FR] France ............................. 86 10307

[51] Int. Cl.⁴ ............................................ B23P 11/02

[52] U.S. Cl. ................................................ 29/235

[58] Field of Search ................. 29/261, 259, 260, 262, 29/235, 234, 237, 222, 224, 280, 282, 451

[56] References Cited

U.S. PATENT DOCUMENTS

| | | | |
|---|---|---|---|
| 2,697,273 | 12/1954 | Clarke et al. | 29/261 |
| 3,605,239 | 9/1971 | Eschholz | 29/235 |
| 4,068,365 | 1/1978 | Brandt et al. | 29/261 |
| 4,091,521 | 5/1978 | Dygert | 29/235 |
| 4,148,125 | 4/1979 | Hanser | 29/235 |

*Primary Examiner*—Robert C. Watson

*Attorney, Agent, or Firm*—Sughrue, Mion, Zinn, Macpeak and Seas

[57] ABSTRACT

An apparatus for seating a ring gasket 100 in a groove 41 in the end socket of a pipe or coupling includes a plurality of radially oriented prong hooks 7 spaced at regular intervals around a circle, and cooperable with an equal plurality of interposed, upstanding studs 24 extending between a circular lower disk 22 and a sectored upper disk 23 defining radial slots 27 to accomodate the prongs. The prongs are driven inwardly together on a support 1 capable of translational motion along an axis X-X perpendicular to the plane of the prongs, and reduce the diameter of a gripped gasket by deforming it into an undulating polygonal configuration. The gasket may then be inserted into the pipe end, whereafter the prongs are disengaged and the gasket expands elastically to seat in its pipe groove 41.

9 Claims, 5 Drawing Sheets

APPARATUS FOR DEFORMING A GASKET

BACKGROUND OF THE INVENTION

The present invention relates to means for seating a gasket in a groove. More specifically, it concerns means designed (i) to manipulate a deformable insert capable of regaining its original shape--that of a circular ring of any cross-section whatsoever--and of forming a seal, and (ii) to set said insert into place in a matching recess, such as a groove, located within a hollow cylinder of revolution such as a cylindrical pipe coupling or the socket at the end of a pipe.

Seating a circular ring in a matching recess requires that the ring be deformed because its outer diameter is necessarily greater than the inner diameter of the cylindrical space containing the matching recess into which the ring will be seated.

In the remainder of this specification, the word gasket will designate the ring-shaped insert, while the word groove shall designate a matching recess in the hollow cylinder. This simplication corresponds to the terms of the most frequent use of the invention, i.e., installing a flexible circular gasket within a groove located inside a hollow cylinder.

Altering the shape of the gasket makes it possible to push the latter into a cylindrical space having a diameter smaller than that of the gasket until a point opposite the groove is reached, at which point the pressure on the gasket is relaxed and the latter regains its initial shape and becomes seated in the groove. In other words, the deformation creates a temporary reduction in the outer diameter of the gasket at rest. In general, annular gaskets are used to seal the outer limit of two areas traversed by a revolving shaft or by a control rod that is allowed to rotate at least during assembly.

In the particular case of joining two pipes, the gasket is installed ahead of time in the groove of the coupling or socket, and the pipes are fitted together on the site by a simple translational movement, since their size makes them difficult to rotate.

In this field, portable and nonportable tools are presently used to compress gaskets and to introduce them into the cylindrical space around the groove. Most of these tools produce a cardioid deformation of the circular gasket, so that the latter comes to resemble two lobes separated by an invagination induced by a digit or prong that is perpendicular to the plane of the gasket at rest, which, by a radial motion toward the center of the gasket, draws the latter inward, while at least two studs parallel to the prong and situated inside the gasket guide and hold the latter.

Tools of the type described above have a number of drawbacks. First, it is difficult to deform the gasket in a single plane, especially if its cross-section is not circular, since deformation normally produces a three-dimensional curve. This makes it more difficult to get the gasket seated in the groove around its entire circumference, and inaccurate positioning must be corrected manually.

The second drawback lies in the fact that when one withdraws the prong that produces the deformation, it is very difficult to prevent the prong from drawing the deformed portion of the gasket along with it in the direction of withdrawal. This is another source of improper positioning in the groove.

Yet another disadvantage arises from the radical deformation of the gasket, which requires the application of considerable force that may cause damage (e.g., cracks, tears, permanent changes in the shape of the insert). These can be prejudicial to the proper functioning of the gasket, particularly in its leakproofing capacities.

As a result of all of these drawbacks taken together, it is difficult to automate the installation of gaskets using three-point tooling that produces cardioid deformation.

SUMMARY OF THE INVENTION

The present invention removes these drawbacks. Its object is means for seating a gasket within a groove that is itself located within a cylindrical space formed by the part that is to be sealed. Said means allow for the deformation of the perimeter of the gasket so that its diameter may be temporarily reduced. The means include a number of prongs extending radially at regular intervals around a circle, with said prongs being capable of moving together in a radial direction on a support that is capable of translational motion along an axis X—X that is perpendicular to the plane in which the radial motion of the prongs occurs.

Using these means, it is possible to install a circular gasket in a groove without any manual intervention when the means of the invention are combined with a manipulator or robot.

The invention therefore saves time over the manual installation of gaskets and guarantees great accuracy of position, something that is often difficult to achieve when the groove is located far from the end of the cylinder.

In addition, by altering the shape of the gasket in a manner that is regularly distributed around its entire periphery, the means of the invention create a relatively low level of deformation and minimize the risk of damage.

BRIEF DESCRIPTION OF THE DRAWINGS

The present invention is presented in detail in the following description, which makes reference to the appended drawings of a preferred embodiment of the invention. The drawings are provided solely as examples.

DETAILED DESCRIPTION OF THE PREFERRED EMBODIMENTS

Figure 1:
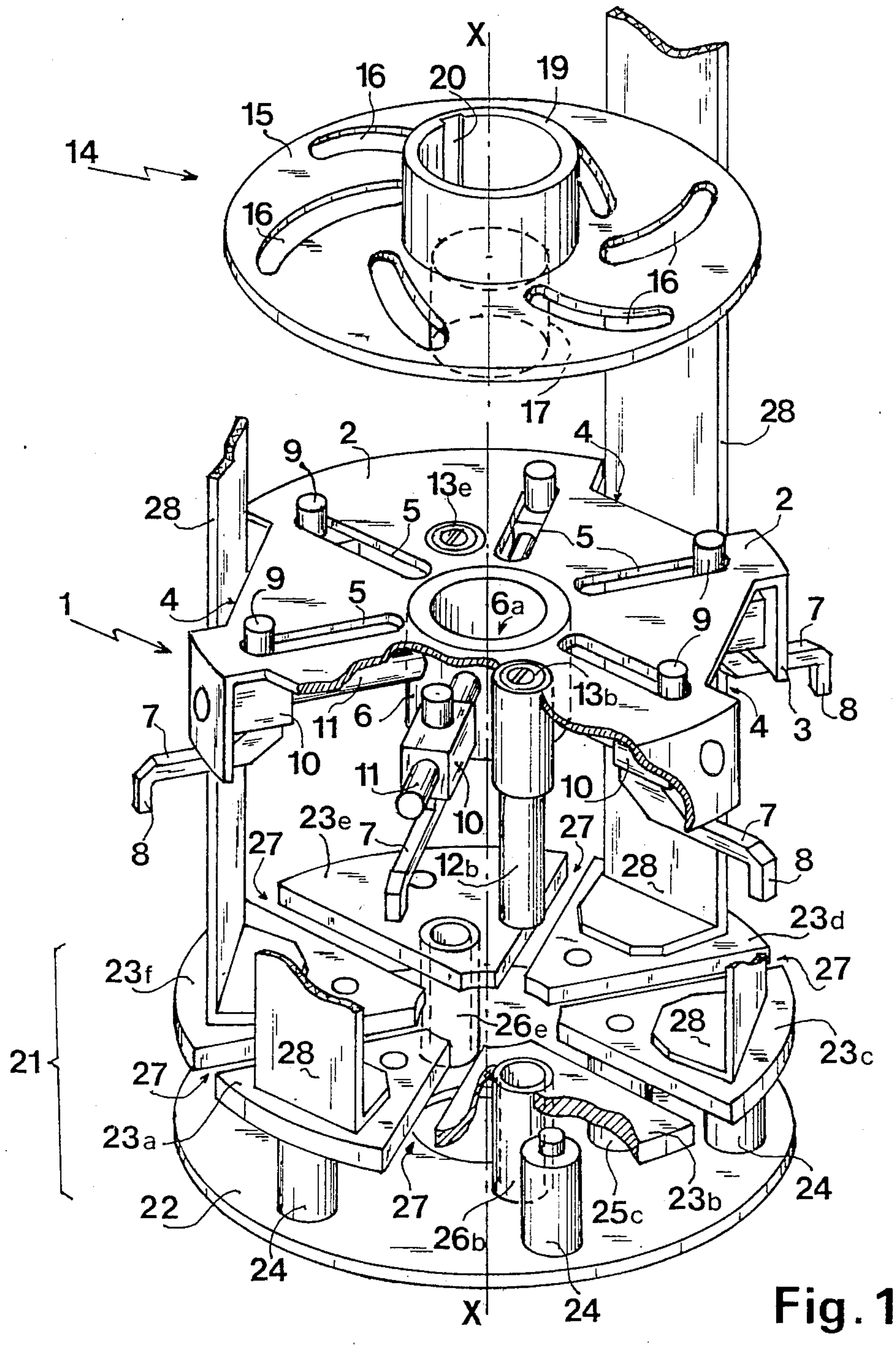
FIG. 1 is an exploded view in perspective, with portions cut away, of the lower part of the the means of the invention, showing the mechanism for gripping the gasket.

In the preferred embodiment of the invention described below, the means for seating gaskets is especially, but not exclusively, designed to be combined with a manipulator or robot that will perform the sequence of operations involved in seating the gasket.

The gasket-gripping mechanism (FIG. 1) is composed of three coaxial assemblies of axis X—X, two pairs of which are each capable of moving relative to the third.

- One assembly 1 serves to support prongs 7, the ends of which have hooks 8 for gripping the gasket, and to enable said prongs to move radially. This assembly is capable of translational motion along axis X—X, which is perpendicular to the plane in which the radial motion of prongs 7 occurs.
- A second assembly 14 forms the mechanical drive means for the prongs 7 of assembly 1. This assembly revolves about axis X—X with respect to assembly 1, but remains integral with the latter with respect to translational motion along axis X—X.
- A third assembly 21 forms means for holding and guiding the gasket during operation. It is composed of two disks 22 and 23. Disk 23, which lies closest to assembly 1, is divided into as many sectors 23*a*, 23*b*, etc., as there are prongs, thereby forming slots 27 through which prongs 7 and hooks 8 may pass. The two disks are joined together by studs 24, 25 or guide tubes 26. Assembly 21 forms part of the frame of the device and is rigidly connected to uprights 28.

Assuming the means of the invention to be standing vertically, the three assemblies are arranged along vertical axis X—X in the following order, from bottom to top:

two-disk assembly 21
prong-support assembly 1
mechanical prong-drive assembly 14.

Each of these assemblies will be described in detail with reference to a particular example containing six prongs regularly distributed around the circumference.

Prong-support assembly 1 is composed of a bottomless cylindrical casing comprising a horizontal plate 2 and a cylindrical side 3. Plate 2 and side 3 contain four notches 4 that accommodate the four uprights 28 that are integral with assembly 21. The center of plate 2 contains a ring 6 of axis X—X, the inner surface 6a of which serves as a journal bearing for revolving prong-drive mechanism 14. Said ring 6 also supports the inner end of guide rods 11 used for the radial displacement of sliding carriages 10 carrying prongs 7. The outer end of said guide rods 11 is attached to side 3. The lower part of each sliding carriage 10 carries a horizontal, radial prong that extends outward. The end of each prong 7 is extended downward in the form of a vertical hook 8. As shown in FIG. 1, when carriages 10 are in outward position (against side 3), prongs 7 protrude beyond the walls of assembly 1.

The upper portion of each carriage further supports a vertical toe 9 that traverses plate 2 through a straight radial slot 5 that limits the travel of the carriage. Toe 9 extends above the upper surface of plate 2 so that it can be engaged by prong-drive mechanism 14 described below. Finally, assembly 1 has two vertical guide rods 12*b* and 12*e* fastened to plate 2 by fasteners 13*b* and 13*e*. These serve to guide assembly 1 during translational movements with respect to assembly 21, as will be explained below. The use of reference lettesr b and e for just two parts is explained by the fact that these two parts interact with two other parts belonging to assembly 21, and it seemed more logical to follow the referencing system required for properly describing the latter assembly.

Assembly 14, the prong-drive means, is composed of a disk 15 pierced by six identical, arc-shaped slots 16 distributed uniformly over the disk's surface, and a ring 17 having axis X—X and matching the bore 6a of guide bearing 6 of assembly 1. Said ring 17 is located below the plane of disk 15 and is fitted over a shaft (not shown) that is integral both with disk 15 and with a coupling sleeve 19 of axis X—X that lies above the plane of disk 15 and is used to drive assembly 14 by rotational means (not shown) set above assembly 14. A key slot 20 inside sleeve 19 provides the connection to the shaft of the rotational means.

Although assembly 14 revolves with respect to assembly 1, it remains integral with the latter with regard to translational motion along axis X—X.

Assembly 21, which forms the lower part of the frame of the means of the invention, is composed of two disks connected by studs. Lower disk 22 is solid, whereas the upper disk is divided into six pieces 23*a*, 23*b*, 23*c*, 23*d*, 23*e*, and 23*f* which are disk sections whose outer limits form the circumference of a circle having the same diameter as that of disk 22, and whose inner limits form a circle of a diameter large enough to permit the passage of ring 6 of assembly 1.

Each disk section is fastened to disk 22 by two parts: either two studs 24 and 25*a*, 25*c*, 25*d*, or 25*f*, for sections 23*a*, 23*c*, 23*d*, and 23*f*, respectively; or a stud 24 and a guide tube 26*b* or 26*e* for diametrically opposing sections 23*b* and 23*e*. For the first four sections mentioned above, the two studs are similar, and these sections are integral with four vertical uprights 28 that form the lateral portions of the frame. The two remaining sections 23*b* and 23*e* are each connected to disk 22 by a stud 24 and a guide tube 26*b* or 26*e* respectively. The guide tubes accommodate vertical guide rods 12*b* and 12*e* fastened under plate 2 of assembly 1 and provide vertical guidance for assemblies 1 and 14 as these move in translation along axis X—X and with respect to assembly 21.

In addition to the three assemblies presented above, the means of the invention as a whole further comprise a top plate 29 that completes the frame formed by the lower double-plate, or assembly 21, and by the four vertical uprights 28 that connect assembly 21 and plate 29. The upper surface of plate 29 supports means 51 for forming a connection with the arm of a manipulator or robot. The space within the frame between plate 29 and rotational assembly 14 contains, in succession:

- An actuator 34 with axis X—X that imparts translational motion along said axis to all elements set below it, up to but excluding assembly 21
- Revolving actuator 31 with axis X—X, the upper portion of which is supported by the vertical rod of actuator 34. A revolving shaft 32 with axis X—X engages coupling sleeve 19 on rotational assembly 14, and is locked in place by a key. Said shaft 32 also engages a second coupling sleeve 18 that extends below the level of disk 15 and supports ring 17, which may be bronze and which serves as a bushing between rotating assembly 15 and nonrotating assembly 1

A cap 30, in the form of a truncated cone, that connects the lower part of rotational actuator 31 and assembly 1, to which it is fastened by means (not shown) on plate 2.

The connections to the external power source necessary for operating actuators 34 and 31 are not shown. Most conveniently, said source may be a compressed air or pressurized fluid system. Said connections are located on plate 29 and are designed to be automatically hooked up to the power lines located on the arm of the manipulator or robot.

Figure 2:
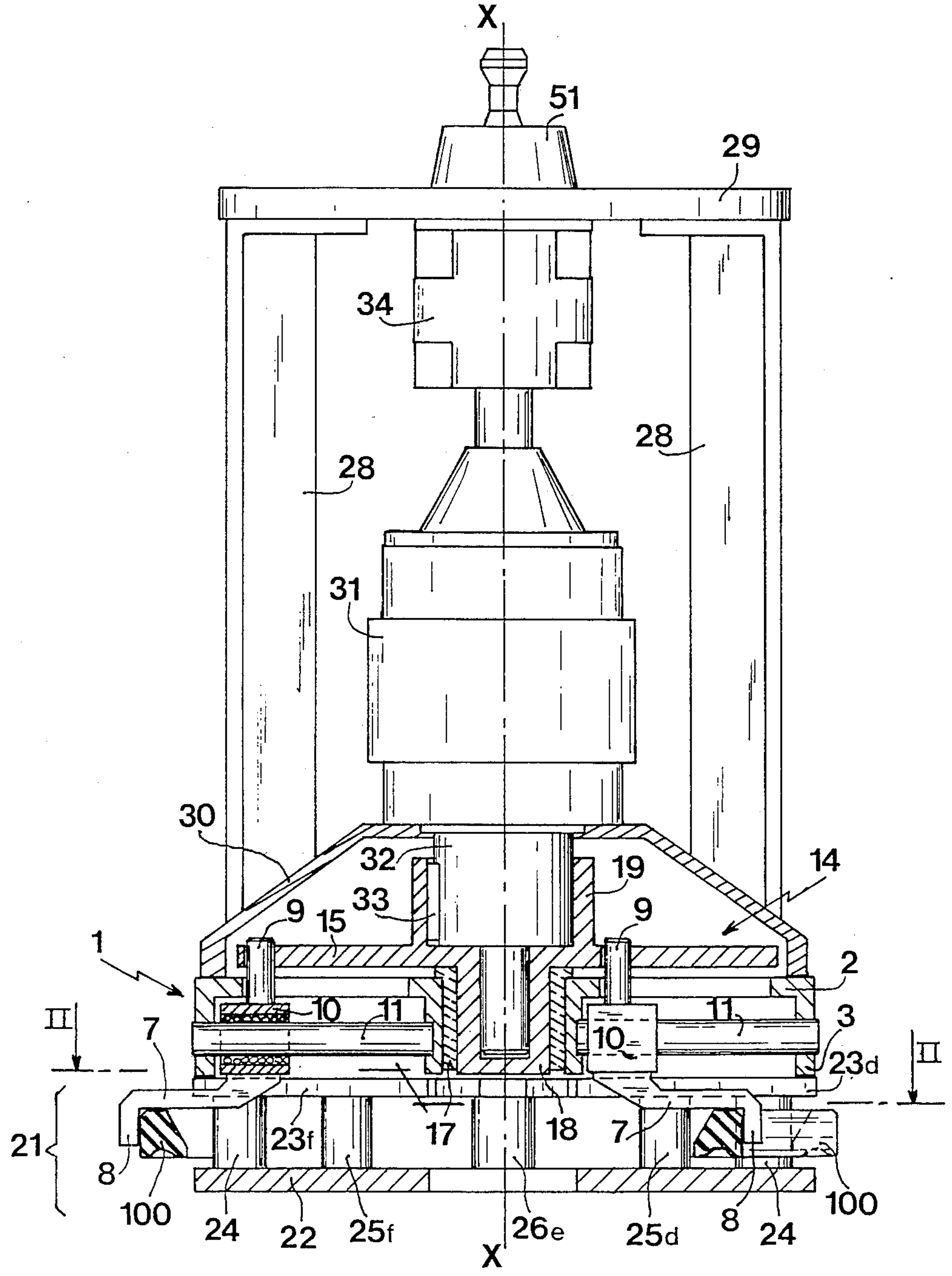
FIG. 2 is partial cross-section of the entire means of the invention along a diametral plane. The left half of the cross-section shows the gripping mechanism before the gasket is picked up. The right half shows the same mechanism after the gasket has been grasped.
Figure 3:
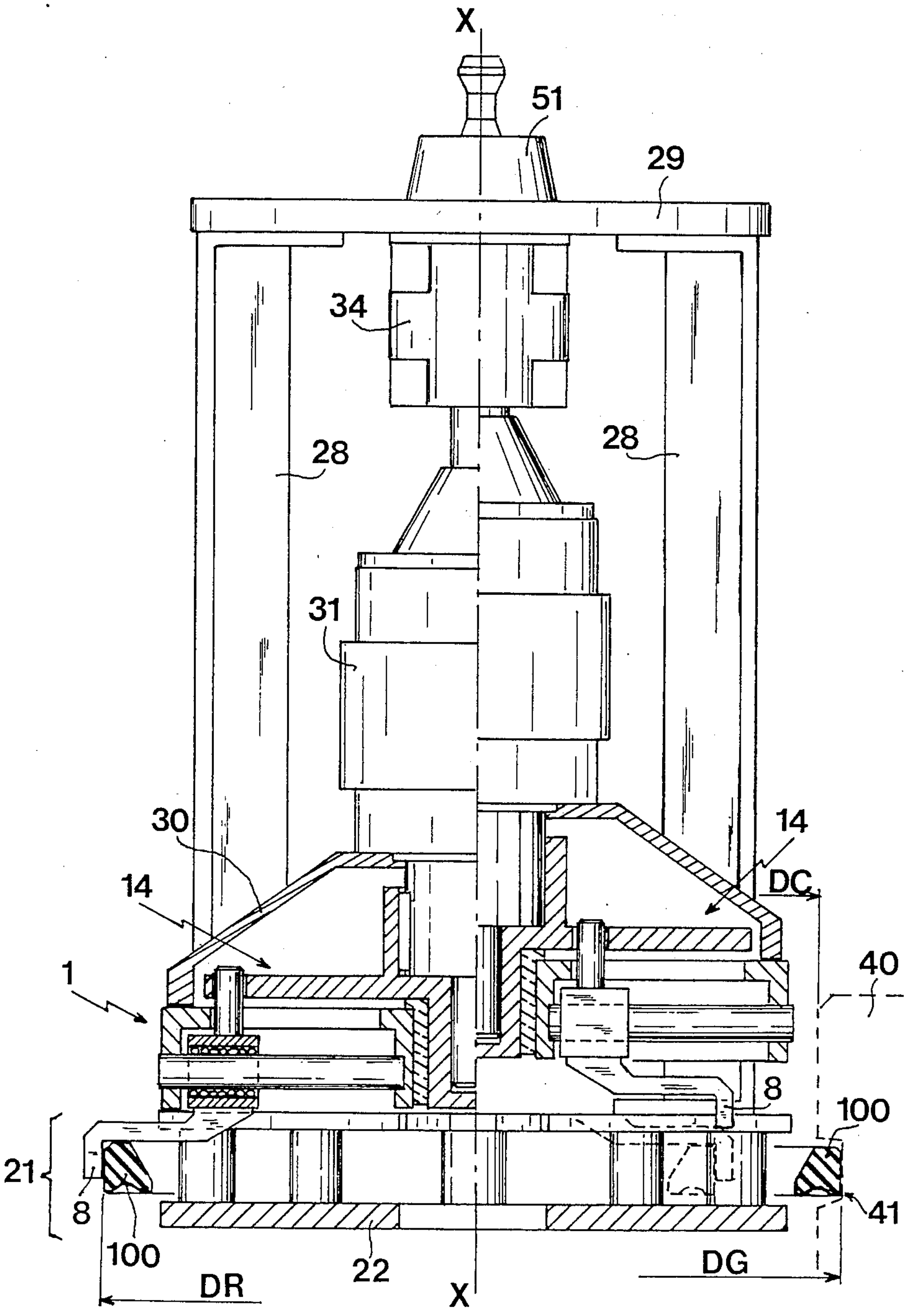
FIG. 3 is a partial cross-section of the entire means and is similar to the cross-section shown in FIG. 2. The left half of FIG. 3 shows the gripping mechanism before the gasket is picked up, while the right half shows the same mechanism after the gasket has been released into the groove.

The position of gasket 100, which is to be seated in a groove located inside a cylinder, is shown in FIGS. 2 and 3 in the successive operating phases of the means of the invention.

In FIG. 2, the left half cross-section of the gripping mechanism shows gasket 100 in rest position prior to its being grasped by the hooks 8 at the ends of extended prongs 7. At this time, carriages 10 on assembly 1 are positioned near the periphery by mechanism 14. In the half cross-section on the right of the drawing, mechanism 14 has turned by an angle corresponding to the length of travel of toes 9 within the arc-shaped slots in disk 15, and has drawn carriages 10 toward axis X—X, thereby placing prongs 7 in retracted position, with hooks 8 grasping the gasket and deforming it in a star-shaped pattern, the outer tips of which are formed by the studs 24 that lie between disk 22 and disk-sections **23*a*, 23*b*, etc. The inner angles are formed by hooks 8**.

In FIG. 3, the half cross-section on the left is identical to that appearing in FIG. 2, whereas the one on the right shows the assembly movable in translation along axis X—X in raised position. Gasket 100, the position of which while constrained is shown in dashed lines, has been released from hooks 8 and, by virtue of its elasticity, has resumed its initial circular shape. Guided by the two disks of assembly 21, positioned opposite the groove 41 inside the hollow cylinder 40 (such as a pipe coupling or socket) that is to receive the gasket, the gasket is seated in groove 41 in a single operation.

Figure 4:
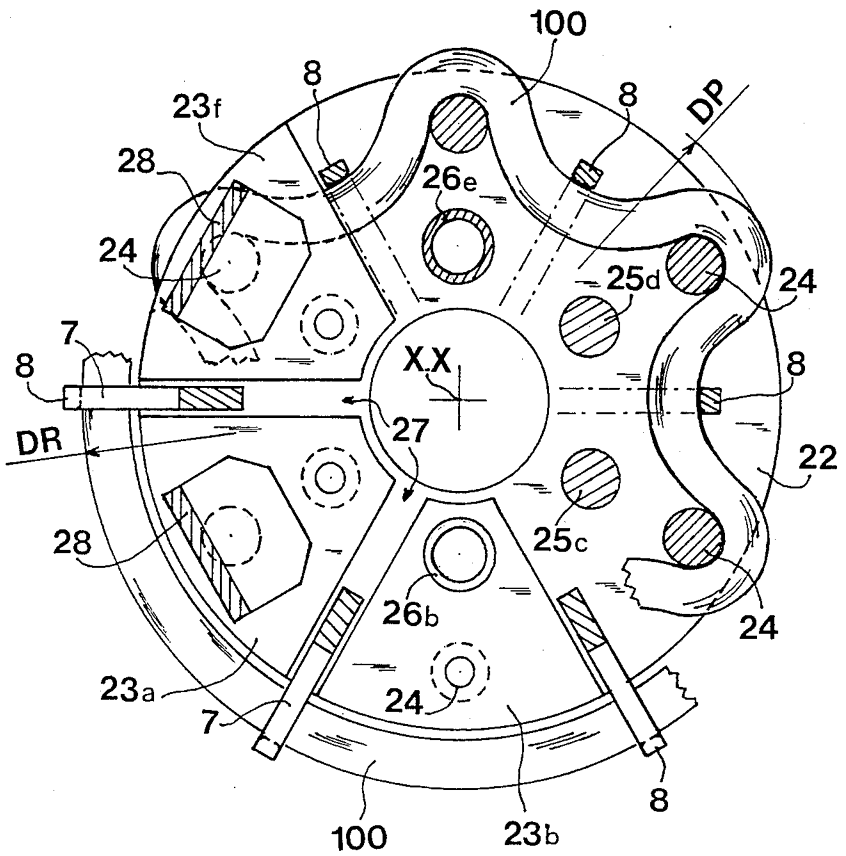
FIG. 4 is a partial plane view of the lower half of the means of the invention along line II—II of FIG. 2 with half of the upper stationary disk removed to show the manner in which the gasket is deformed.

The star-shaped deformation of gasket 100 is clearly shown in FIG. 4, which complements FIGS. 2 and 3 in depicting the operation of the means of the invention.

In FIG. 4, three of the six prongs 7 are shown extended and three retracted. The same reference numbers designate the parts previously described. When the prongs are extended and gasket 100 is at rest, the diameter of the latter is DR [Diameter at Rest]. When the prongs are retracted, causing the gasket to assume the shape of a star, the maximum diameter of the gasket becomes DP [Provisional, or Temporary, Diameter] opposite retaining studs 24. The means of the invention are arranged so that said diameter DP will be less than the diameter DC of the cylindrical space containing groove 41, so that said means may enter entirely into said cylindrical space. Naturally, the diameter DG of the groove must be slightly less than the diameter DR of the gasket at rest in order to ensure that the gasket will be held fast in the groove.

Figure 5:
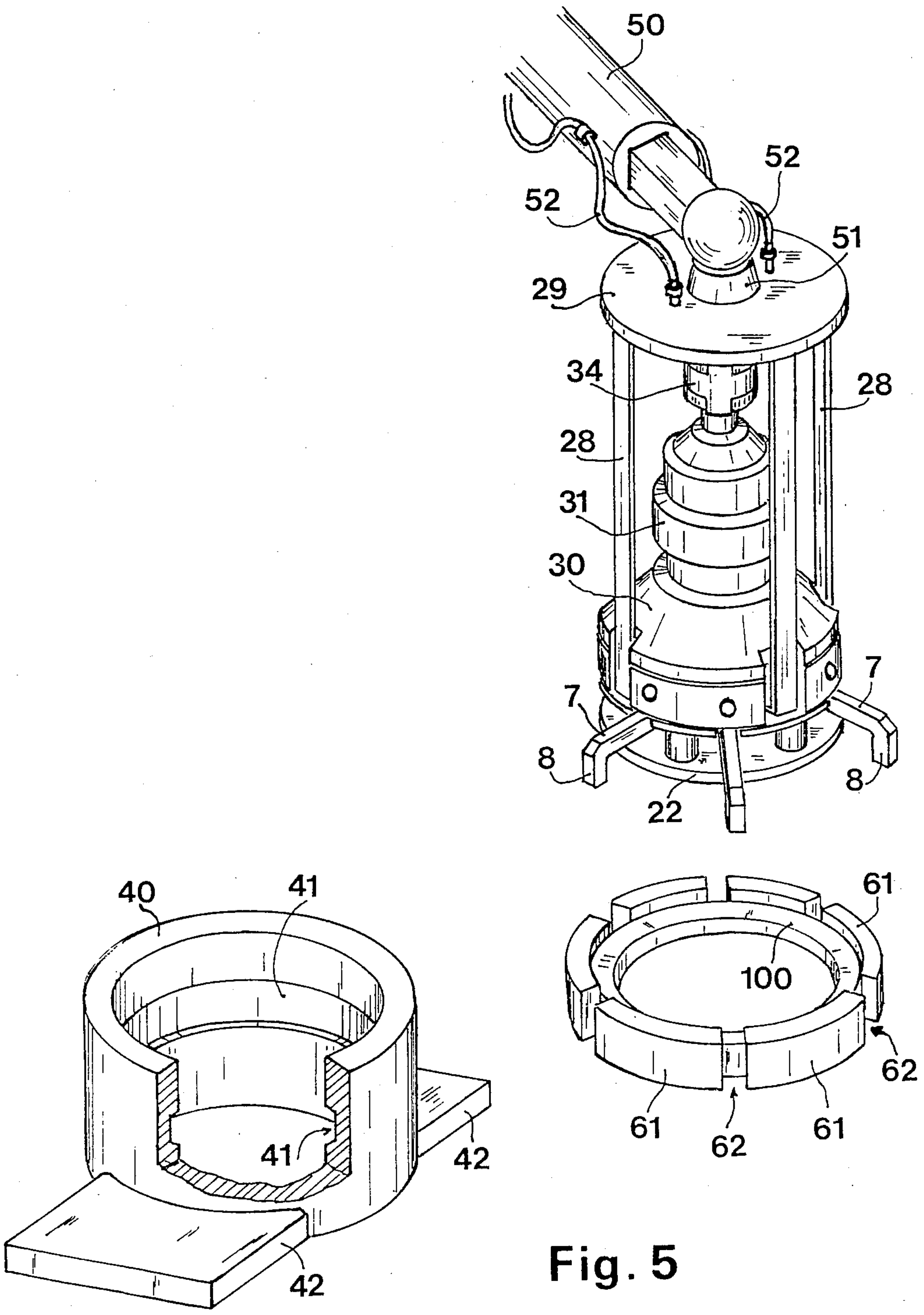
FIG. 5 shows the means of the invention attached to the arm of a manipulator positioned to pick up a gasket sitting on a centering and distributing tool next to a pipe coupling that has been partially cut away to show the groove. The coupling is also seated on a centering device.

The operation of the gasket-seating means of the invention may be summarized with reference to FIG. 5. It is assumed here that the means of the invention fastened by part 51 to the arm 50 of a manipulator or robot are receiving the external power required for the functioning of the actuators through lines 52 (which may contain compressed air).

Gasket 100 is presented by any suitable external means in a centering tool consisting of six disconnected ring sections 61 that form six slots 62 to accommodate prongs 7 and terminal hooks 8 when the prongs are retracted.

The means of the invention are positioned above the gasket and lowered to a point at which the gasket lies at the level of the two disks forming assembly 21. The prongs, which have remained extended to this point, are now retracted by action of rotational actuator 31 on prong-drive mechanism 14. As a result, the gasket becomes deformed in a star-shaped pattern, as described above.

The means of the invention are then raised with the gasket and positioned above hollow cylinder 40 containing groove 41. Piece 40, which in the example of FIG. 5 is a pipe coupling, is partially cut away to show groove 41. In the drawing, piece 40 is set within a positioning tool 42.

The means of the invention are then lowered into the cylinder 40 to a level at which the deformed gasket is opposite groove 41. At this point, the entire portion capable of moving in translation along axis X—X is raised by action of actuator 34, thereby freeing gasket 100 from the hooks 8 that had been holding it in its deformed configuration.

The means of the invention are then removed, with the prongs still retracted so as to clear the cylinder. When the prongs are once again extended a new cycle can be begun, as soon as a new gasket has been centered on the special tool and a new coupling placed on the centering tool.

It can be seen that with the aid of the means of the invention it is easy to seat a gasket in the inner groove of a pipe coupling or socket both quickly and securely and that the operation can be automated by providing for an automatic supply of gaskets and of elements to be equipped with gaskets.

Of course, means of suitable size must be provided for each diameter of gasket and groove, but if the work station is automated, the robot or manipulator may change means to match the diameter of the pieces that are to be automatically equipped with gaskets.

Because by their very nature the means of the invention produce a star-shaped deformation of the gasket, with the deformation distributed uniformly around the circumference of the gasket, the [resulting stresses] remain relatively slight and the gasket does not run the risk of damage due to excessive localized deformation.

Because it is held between the two disks of assembly 21, the deformed gasket remains essentially in a single plane. When the prongs are retracted, the same disks guide the gasket so that when it regains its initial shape it becomes seated in the corresponding groove in a single operation.

The preceding description has dealt with gasket-seating means comprising six prongs and designed with a view to automating the installation process. Obviously, the number of prongs could be changed, provided there remain at least three, without departing from the scope of the invention.

Similarly, the means of the invention may be adapted to produce a hand tool for small diameters. In this case, actuators 31 and 34 are replaced with a control rod that may be operated manually by means of a wheel placed at the end of the rod in place of connector 51.

Said rod would make it possible to impart the rotation needed to control the movement of the prongs, as well as the translation needed to release the gasket, with a stop being placed on the rod so as to abut the frame and so limit the translational motion. Stops set on the uprights 28 of the frame would make it easy to position the devide opposite the groove.

In summary, the means of the invention may be used to install a deformable insert, which may be a gasket, within a matching recess, which may be a groove lying inside a hollow cylinder. Said installation may take place manually, or may be performed semiautomatically by a manipulator or automatically by a robot, which may be programmable.

I claim:

1. An apparatus for seating a ring gasket (100) in a groove (41) defined within a cylindrical space formed by a pipe socket (40) or the like that is to be sealed, comprising: a plurality of radially oriented prongs (7) disposed at regularly spaced intervals around the circumference of a first support member (1), a second support member (22) disposed below the first support member, an equal plurality of studs (24) upstanding from the second support member, said studs being disposed in a circular orientation and interleaved with said prongs, means (14) for reciprocably driving said prongs together in a radial direction on the first support member, and means for translating the first support member and prongs along an axis (X—X) perpendicular to the plane of radial motion of the prongs such that a gasket may be engaged by the prongs and studs at spaced intervals around its outer periphery and elastically deformed into an undulating polygonal configuration of reduced maximum diameter by the radially inward movement of the prongs, inserted into the pipe socket, and released to expand into the groove by the axial withdrawal of the support members and prongs.

2. The apparatus of claim 1, wherein each prong (7) has a hook (8) at its outer end extending in a direction perpendicular to the plane of the prongs for engaging the gasket, and a drive element (9) for implementing said radial movement.

3. The apparatus of claim 2, wherein said driving means (14) mechanically interacts with said drive elements (9) and moves in axial translation together with the first support member.

4. The apparatus of claim 2, wherein the hooks (8) are disposed in radial slots (27) formed in a circular double disk unit (21).

5. The apparatus of claim 4, wherein the circular double disk unit comprises a lower disk (22) defining the second support member and a spaced, parallel, sectored upper disk (23) defining the slots, and wherein the studs (24) extend between the disks and flank the slots for engaging the inner periphery of the gasket at apices of the polygonal configuration.

6. The apparatus of claim 5, wherein the hooks form, when the prongs are extended, a circle whose diameter is greater than the external diameter (DR) of the gasket at rest such that the hooks can surround the gasket pursuant to engaging it, and, when the prongs are retracted, a circle whose diameter is less than that of a circle formed by the studs.

7. The apparatus of claim 3, wherein each drive element (9) includes a toe integral with an associated prong and extending parallel to said axis in a direction opposite that of the hooks, said toes being movable in straight, radial slots in a plate of the first support member, and slidably engaging in arc-shaped slots (16) regularly spaced around a disk (15) of the driving means perpendicular to said axis and rotatable about said axis, with said rotation imparting a radial translation to the prongs.

8. The apparatus of claim 2, further comprising a rotational actuator (31) coupled to the driving means, and an axial translational actuator coupled to the support member.

9. The apparatus of claim 8, further comprising a programmed robot manipulator (50) coupled to said apparatus by a connector unit (51) mounted to a plate (29) of a frame of the apparatus.

* * * * *